Jan. 1, 1935.  H. M. BRUNDRETT  1,986,756
SPRAYING MACHINE
Filed June 12, 1933
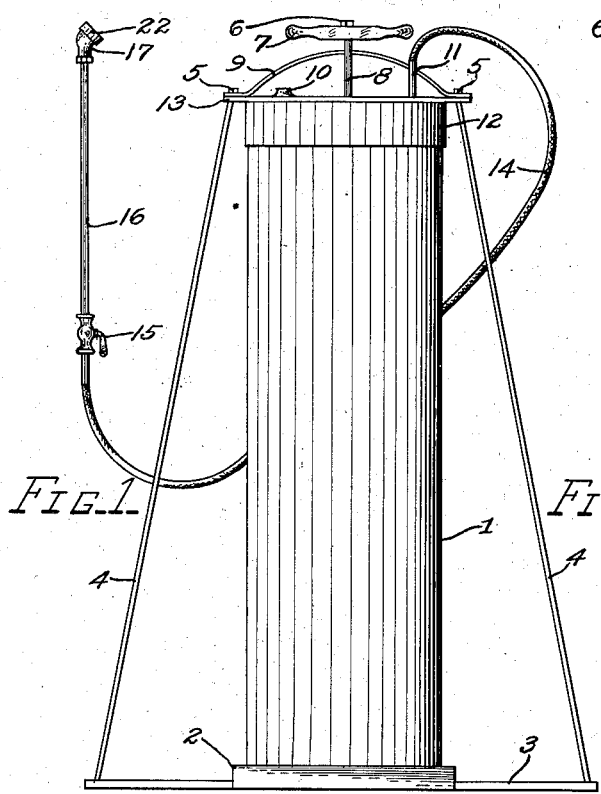
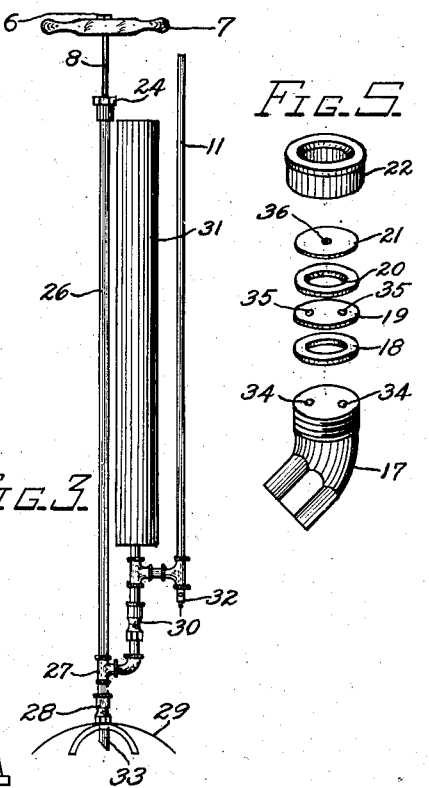
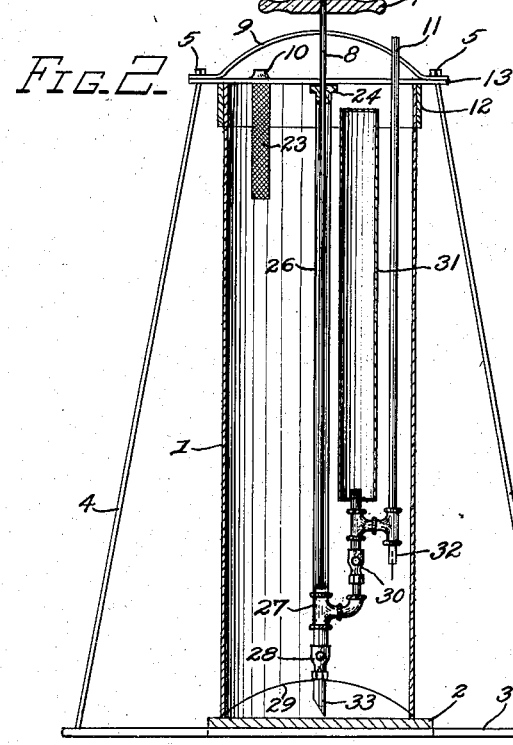
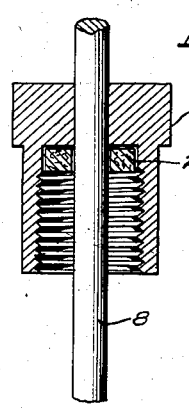
INVENTOR
Herald M. Brundrett
C. M. Boyle
ATTORNEY Patented Jan. 1, 1935

1,986,756

UNITED STATES PATENT OFFICE 1,986,756

SPRAYING MACHINE

Herald M. Brundrett, Stephenville, Tex., dedicated to the free use of the public Application June 12, 1933, Serial No. 675,443

1 Claim. (Cl. 299—97)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

I hereby dedicate the invention herein described to the free use of the public in the territory of the United States of America to take effect upon the granting of a patent to me.

This invention relates to improvements in spraying machines from which light oils or aqueous solutions are sprayed for the purpose of controlling insects; and the objects of my improvements are, first, to provide a small hand pump capable of exerting a high pressure (0 to 600 pounds per square inch) upon the liquid so that it will be properly nebulized and distributed; second, to provide a nozzle which, under the high pressure, reduces the flow of liquid to a rate adequate for the proper spraying of livestock, and one which will produce in the spray a greater spread and throw and break-up than is produced by other similar machines.

An important object of the invention is its portability. Being light of weight and easy to operate makes it a desirable type to use among livestock. This sprayer was designed particularly to be used in dairy barns for protecting cattle from the attacks of flies and other insects.

Another object of my invention is to provide accessibility to all parts for adjustment and repair when necessary.

At present there are no satisfactory machines on the market with which dairy cattle can be sprayed successfully. Their inefficiency lies in the fact that they either spray too large a volume of liquid, which is costly and also burns the cattle, or else they spray a fine mist, which is diluted with such a quantity of air that it is not effective. The air blast also has a tendency to frighten the flies away before enough of the spray material has been applied to them.

Another disadvantage of present machines is the form of spray distribution which does not have the correct break-up, throw, spread, and regularity.

These and other objects are attained by the construction shown in the accompanying drawing, in which the same reference characters indicate the same parts in all of the views.

Fig. 1 is an elevation view of the machine showing the exterior parts.

Fig. 2 is a vertical section showing the internal construction and arrangement of the various parts.

Fig. 3 is an elevation of the internal parts of the machine.

Fig. 4 is a vertical section of the stuffing box on the upper end of the pump cylinder.

Fig. 5 is a perspective view of the nozzle unassembled showing its respective parts.

Referring now more particularly to the drawing, the metal spray tank 1 is supported upon a wooden base 2 into which is fastened the channel-iron foot-rest 3 from the ends of which the tie rods 4 run to the cross-member 13 and handle 9, passing through the ends of these. The nuts 5 when screwed upon the rods 4 hold the handle 9, cross-member 13, tank cover 12, tank 1, base 2, and foot-rest 3, securely together.

The tank is refilled by removing screw cap 10 and pouring the spray material through strainer 23 which is composed of 200 mesh bronze gauze. Upon moving pump plunger 8 in a vertically reciprocating motion, by means of handle 7, which is secured to pump plunger 8 with nut 6, the spray material is drawn into the pump cylinder 26 through intake pipe 33 and downward closing ball check 28 and T 27. The spray material is then forced out through T 27 and downward closing ball check 30 into surge chamber 31 and into spray line 11, flexible bronze hose 14, through cut-off 15, spray-rod 16 and out of nozzle 17.

Upon operating the pump the spray material flows into the surge chamber 31 against the air confined therein. The air being compressible exerts a counter force against the liquid causing the liquid to flow out of spray line without surging. The spray material is kept from flowing out of upper end of pump cylinder 26 by means of stuffing box 24 which is screwed onto cylinder 26 and through which pump plunger 8 reciprocates. Inside stuffing box 24 is asbestos packing 25 which presses against pump plunger 8, when stuffing box 24 is screwed down upon pump cylinder 26, thus preventing leakage around pump plunger 8.

Relief valve 32 is placed in the spray line to relieve the machine of excessive pressure when cut-off 15 is closed and the pump operated. This being a conventional type of relief valve it is set to relieve at a desired pressure by turning a nut against a coil spring which presses the valve head into the seat. In this machine the relief valve is set to open at 350 pounds per square inch, hydraulic pressure.

The metal foot 29 is placed on intake pipe 33 to keep lower end of pump system centrally located within the tank.

The double eddy-chamber nozzle shown in Fig. 5 is composed of nozzle body 17 through which the spray material flows into eddy-chamber formed by placing leather ring gasket 18 between nozzle body 17 and basal disc 19. The liquid then flows through basal disc 19 into eddy-chamber formed by placing leather washer 20 between basal disc 19 and spray disc 21. The discs and washers are held tightly together on nozzle body 17 by nozzle cap 22 which is screwed onto nozzle body. Two cylindrical orifices 34, 35 are drilled through each, the nozzle body 17 and basal disc 19 at an angle of 45 degrees to their faces. The cylindrical orifice 36 through spray disc 21 is drilled at an angle of 90 degrees to its face. The spray material passing through these angular orifices at high speed is set to rotating rapidly within the eddy chambers, and passes through the orifice of spray disc 21 from which it is ejected in the form of a fine mist. Discs having different sizes of orifices are used to produce sprays of different rates of flow.

It is understood that by describing in detail herein any particular form, structure, or arrangement, it is not intended to limit the invention to such specific structure except as hereinafter claimed.

I am aware that prior to my invention portable spraying machines have been made with reciprocating pump and single eddy-chamber nozzles, I therefore do not claim such a combination broadly, but having thus described my invention, what I claim as new and desire to secure by Letters Patent is:

In a spraying device, a spray tank, a base supporting said tank, a foot-rest attached to and protruding a substantial distance from beneath the opposite sides of the base, a tank cover for the top of the tank, a cross-member extending across and slightly beyond the sides of the cover, a handle attached to the cover, tie rods passing through the protruding portions of the foot rest and removably affixed to said cross-member and handle, a removable pump cylinder vertically positioned within the spray tank and having an opening at its lower end, means to maintain the pump cylinder in the desired position adjacent to said cover, a pump plunger positioned within the pump cylinder and passing through said cover and having a handle, a surge chamber vertically positioned within the spray tank, pipe means connecting the surge chamber at its lower end with the pump cylinder near the lower end of the pump cylinder, a check valve located within the pump cylinder between the opening in the pump cylinder and said pipe, a second check valve located within the pipe, a spray line vertically positioned within the spray tank and connected with said pipe between the surge chamber and the last mentioned check valve, said check valves being designed and located to permit the flow of spray material toward the surge chamber and spray line only and a relief valve attached to the spray line within the spray tank, said spray line extending through the tank cover.

HERALD M. BRUNDRETT.